June 28, 1960 R. J. GROSS ET AL 2,942,815
APPARATUS FOR RETRIEVING OBJECTS
DESCENDING BY PARACHUTE
Filed April 19, 1956 5 Sheets-Sheet 1
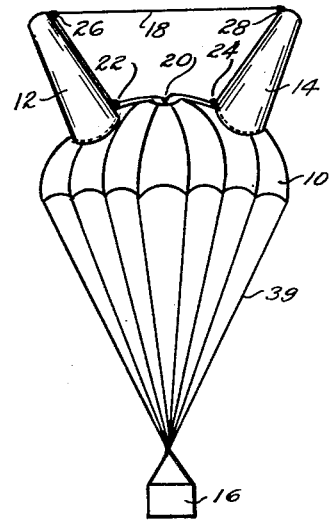
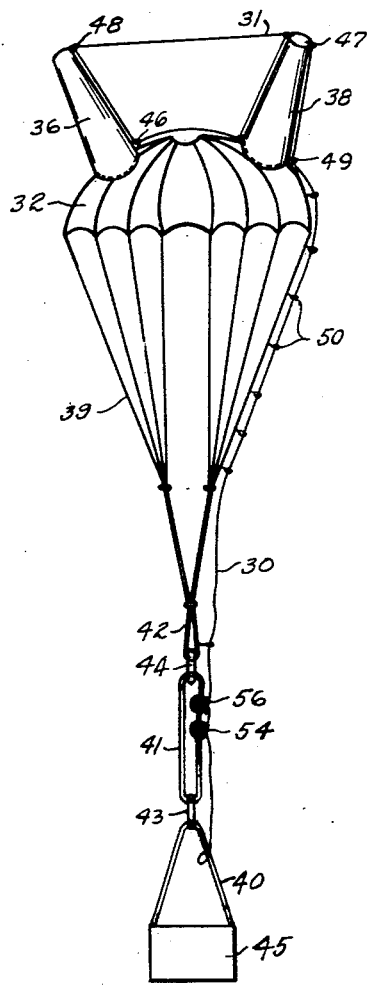
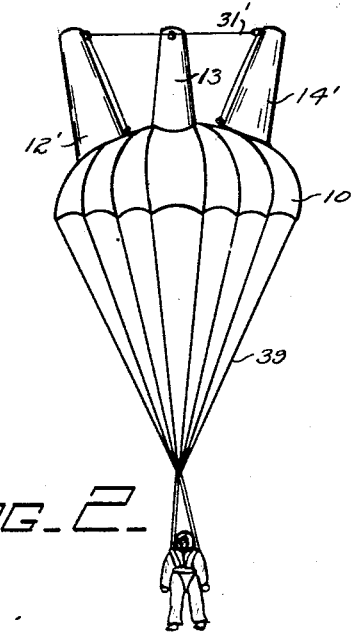
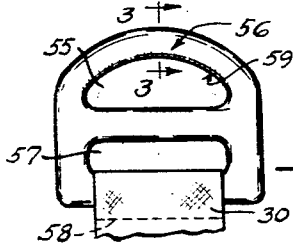
INVENTORS.
REINHOLD J. GROSS
CHARLES N. MOSER
BY
ATTORNEYS June 28, 1960 R. J. GROSS ET AL 2,942,815
APPARATUS FOR RETRIEVING OBJECTS
DESCENDING BY PARACHUTE
Filed April 19, 1956 5 Sheets-Sheet 2

INVENTORS.
REINHOLD J. GROSS
CHARLES N. MOSER
BY
ATTORNEYS

June 28, 1960 R. J. GROSS ET AL 2,942,815
APPARATUS FOR RETRIEVING OBJECTS
DESCENDING BY PARACHUTE
Filed April 19, 1956 5 Sheets-Sheet 3

INVENTORS.
REINHOLD J. GROSS
CHARLES N. MOSER
BY
AND
ATTORNEYS

June 28, 1960

R. J. GROSS ET AL 2,942,815

APPARATUS FOR RETRIEVING OBJECTS
DESCENDING BY PARACHUTE

Filed April 19, 1956

INVENTORS.
REINHOLD J. GROSS
CHARLES N. MOSER
BY
ATTORNEYS

June 28, 1960 R. J. GROSS ET AL 2,942,815
APPARATUS FOR RETRIEVING OBJECTS
DESCENDING BY PARACHUTE
Filed April 19, 1956 5 Sheets-Sheet 5
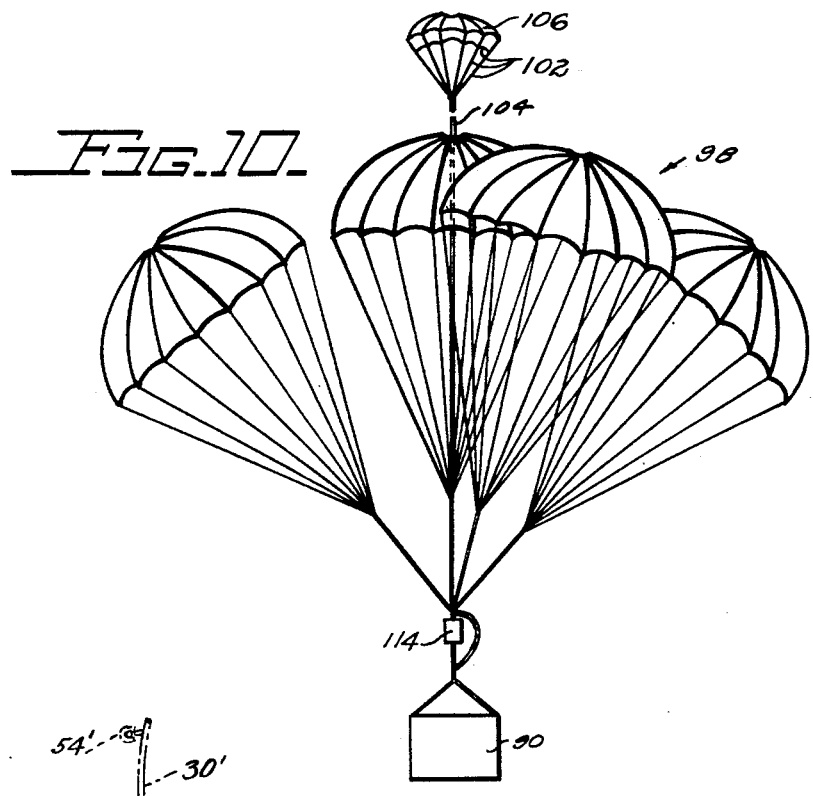
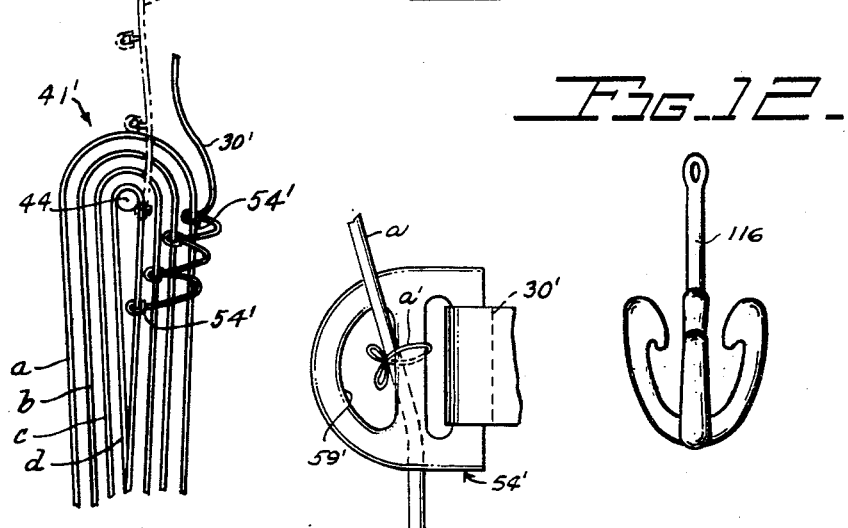
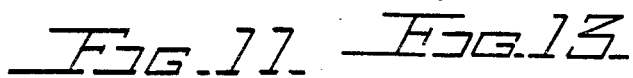
INVENTORS.
REINHOLD J. GROSS
CHARLES N. MOSER
BY
ATTORNEYS

United States Patent Office 2,942,815
Patented June 28, 1960

---

2,942,815

APPARATUS FOR RETRIEVING OBJECTS DESCENDING BY PARACHUTE

Reinhold J. Gross and Charles N. Moser, Dayton, Ohio, assignors to the United States of America as represented by the Secretary of the Air Force Filed Apr. 19, 1956, Ser. No. 579,416

8 Claims. (Cl. 244—137)

(Granted under Title 35, U.S. Code (1952), sec. 266)

The invention described herein may be manufactured and used by or for the United States Government for governmental purposes without payment to us of any royalty thereon.

This invention relates to devices and systems for air retrieving of objects descending by parachute and, more particularly, to construction of parachute canopy and arrangement of pickup lines for retrieving in mid air a capsule, a gondola, a parachutist or any other object.

The object of the invention is the provision of a retrieving line system and canopy construction whereby a parachutist, a capsule, or any other load may be retrieved in mid air, and the parachute either salvaged or jettisoned. This is accomplished even when the parachutist is injured or unconscious.

A further object of the invention is the provision of means whereby cargo and personnel escaping from aircraft in trouble over enemy territory may be picked up in mid air by rescue aircraft, and either taken on board the rescue aircraft, or towed to another location more desirable for landing, and there released to descend by means of its own parachute.

A further object of the invention is the provision of means incorporated in and forming a part of the parachute canopy which means provides a device for anchoring retrieving lines.

A further object of the invention is the provision of means, operable by the parachutist, incorporated in and forming a part of a parachute canopy, for rotating the parachute and changing the position of the parachutist in descent for advantage in landing, for better observation, or for cooperating with rescuing aircraft.

A further object of the invention is the provision of means whereby a parachutist is enabled to orient himself and his parachute for cooperating in a pickup or retrieving operation.

A further object of the invention is the provision of a new and improved means for cutting a strap for the purpose of disengaging or releasing a load or a parachutist from his parachute.

The specific adaptation and uses of this invention are extensive in scope. For example, in mail delivery operations, where mail is ejected from a delivery aircraft and picked up by a receiving station; or in dangerous reconnaissance missions a camera may be ejected over dangerous territory, the ejecting aircraft retreating to safer terrain and later returning to retrieve it.

A further object of the invention is the provision of means, incorporated into the canopy of a parachute and operable by the parachutist, which means serve the triple purpose; first, of providing anchoring means for a retrieving line; second, providing means for rotation of the parachute and parachutist when such is desired; and third, providing stabilization.

A further object of the invention is the provision of means for retrieving a capsule, a parachutist or other load where the parachutist, the capsule or other load are descending by means of a plurality or cluster of parachutes.

A further object of the invention is the provision of a new and improved means for breaking a retrieving line away from a parachute when the parachute or parachutes are to be jettisoned, thus providing an attachment between load and parachute which is frangible and severable.

The device of the invention is shown schematically in the drawings in which:

Figure 1 is a view of a load and parachute in mid air, showing a pickup line secured to the parachute in position for retrieving of the parachute and load.

Fig. 2 is a view similar to Fig. 1 showing three extensions in line on the upper portion of the parachute in place of two.

Fig. 3 is a view of a retrieving system wherein the load alone is retrieved and the parachute itself is jettisoned.

Fig. 3A is a detailed view of a form of link cutting device.

Fig. 3A' is a cross sectional view on the line 3—3 of Fig. 3A.

Figure 4:
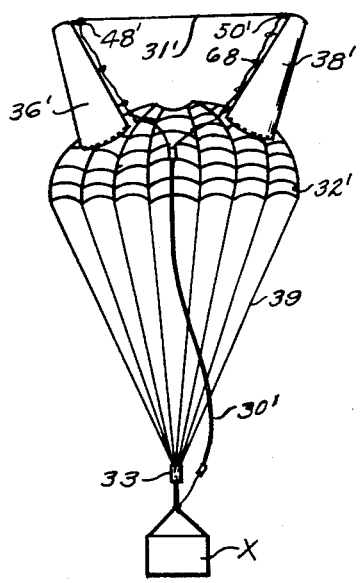

Fig. 4 is a view similar to Fig. 3 showing a ribbon parachute and a modified arrangement of retrieving line.

Figure 5:
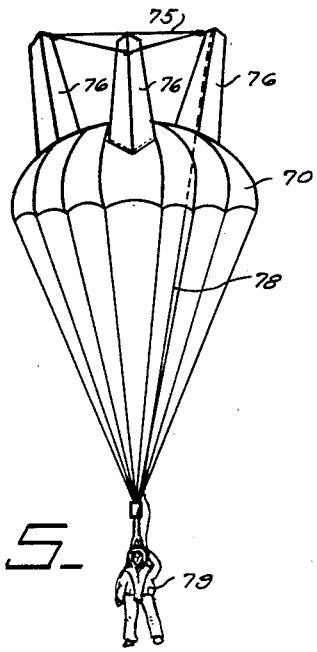

Fig. 5 is a view showing a modified form of the canopy extensions designed for optionally rotating the parachute.

Figure 6:
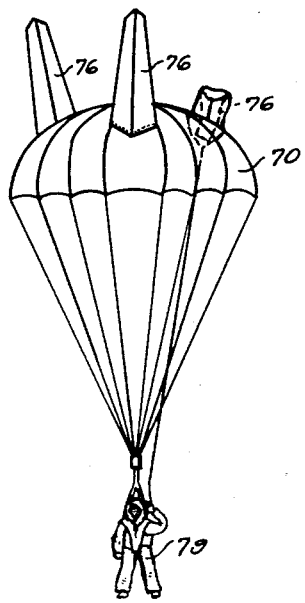

Fig. 6 is a view of the device shown in Fig. 5 showing one of the extensions in collapsed condition.

Figure 7:
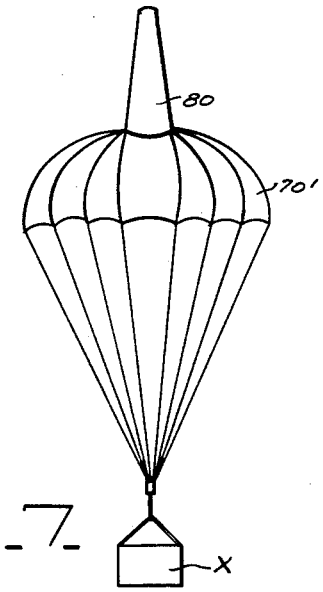

Fig. 7 is a view of a further modified form.

Figure 8:
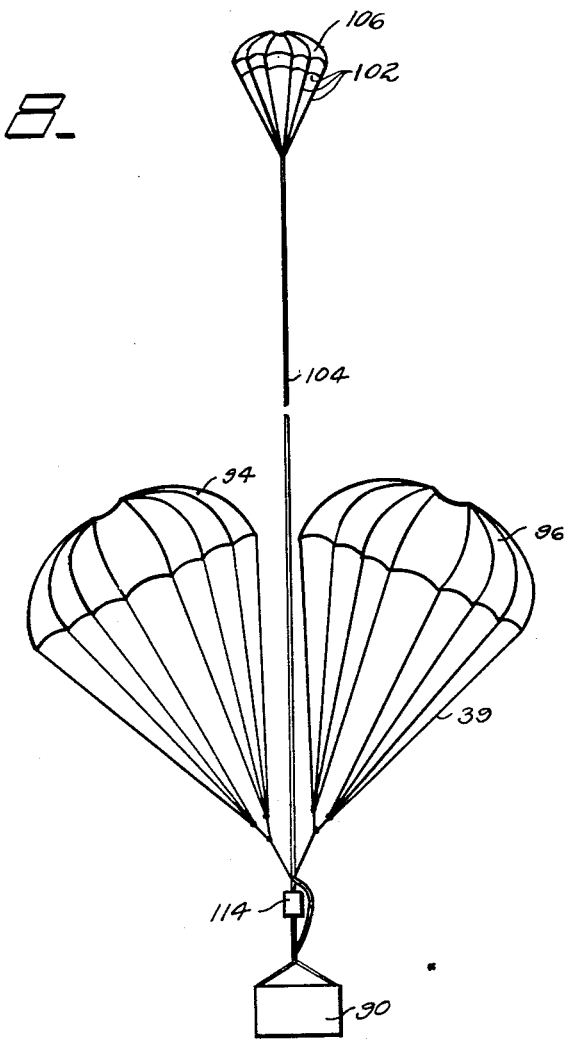
Figure 9:
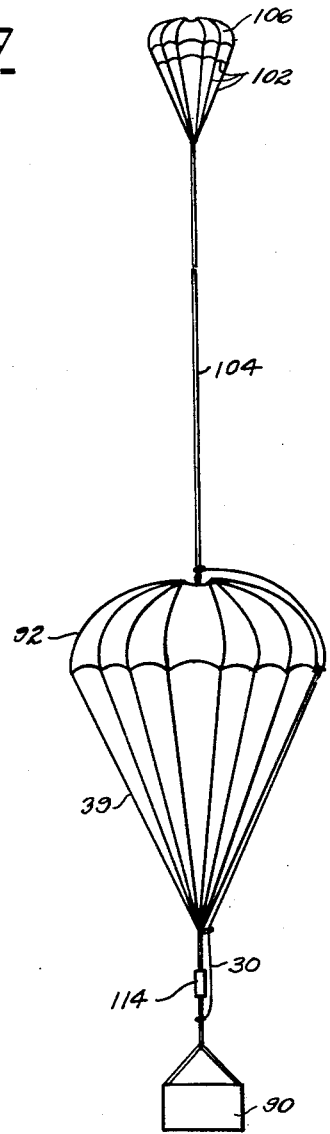

Figs. 8, 9, and 10 are views of a modified system wherein the pickup loop is carried by a relatively small parachute and wherein the load is carried initially by one, two or a cluster of parachutes.

Fig. 11 is a detail view of an exploded form of laminated temporary load carrying strap and strap cutting means.

Fig. 12 is a detail of the pickup hook carried by the pickup line of the rescuing aircraft.

Fig. 13 is a detail view of the D-ring and linkstrand of Fig. 11.

Referring more in detail to the drawing and referring particularly to Fig. 1, a canopy 10 is provided with two truncated, conically shaped extensions 12 and 14. In Fig. 1, the parachute is shown carrying a load 16 which is a parcel or package containing supplies, ammunition, etc. It is to be understood that in each of the showings in the drawings, except where the presence of a parachutist is necessary for the operation of the device, that any sort of load may be substituted for the one shown.

The extensions are formed of truncated cone shaped portions, preferably closed at the top; but they may be open, partially open, or closed, as desired. The cone shaped portions are sewed into the canopy and form integral sections of it, capable of being inflated when the canopy is inflated. The extensions are sewed into the canopy in such a manner that the strength of the canopy is not impaired.

In Figure 1 the pickup line is formed of a loop 18, and its attachments to the canopy are permanent, since the parachute and the load are both to be retrieved. The loop 18 is shown secured at the apex of the canopy at 20, the base of the extensions at 22 and 24, and at points 26 and 28, at or near the top of the extensions 12 and 14. As will be seen, a loop is formed, and a portion of the line 18 extends horizontally between the points 26 and 28 for convenient engagement by the retrieving hook of a rescuing aircraft.

Fig. 2 shows a device similar to Fig. 1. In conditions where the horizontal segment of the pickup line sagged and added difficulty in the pickup operation, it was thought advisable to add a third extension 13, which was placed at the apex of the canopy in line with the extensions 12' and 14'. It serves the purpose of additional support for the engageable portion of the retrieving loop 31'. In this figure the load is shown as a parachutist, but may be a package or capsule or any other desired type of load.

In the form of the invention shown in Figures 3, 4, 8, 9, and 10, the load or capsule or parachutist is retrieved, and the parachute or parachutes are jettisoned.

In Fig. 3 the canopy 32 is provided with two members 36 and 38 which extend upward from, and form an integral part of it. The pickup retrieving line 30 is formed with a retrieving loop portion 31 which is attached, by means of breakable or detachable tackings 46, 47, 48 and 49, to points near the base of the cone shaped extensions 36 and 38, and at points at or near their tops. The loop 31 may extend loosely over the canopy or may be attached with frangible connection to the apex. The line 30 continues over the top of the extension 38, is tacked loosely to its base at 49, and follows down one of the shroud lines 39 to which it is attached with frangible connections 50. The shroud lines 39 are gathered into two groups which are attached to the two ends of a cable 42. The cable 42 forms a loop which passes through a ring 44.

The retrieving line 30 is permanently secured to the load 45. The parachute canopy 32 is attached to the load 45 by means which are severed during the retrieving operation. One specific way in which this can be accomplished is shown in Fig. 3. As described, the shroud lines 39 are attached into a ring 44. A load carrying cable 40 is permanently secured to the load 45 and is drawn through a ring 43. Linking loop 41, which forms a severable attachment between the parachute and load, passes through both of the rings 43 and 44 and anchors the load to the parachute. The retrieving line 30 is permanently secured to the cable 40. A pair of cut knives 54 and 56 are threaded onto the link 41 through their eyes or openings 55. The retrieving line 30 is passed through D-ring opening 57 and secured thereto by expedient means such as stitching 58. The cut knives 54 and 56 are standard D-rings whose inner curved surfaces have been sharpened to form cutting edges 59.

In the operation of this device, when the retrieving hook is caught into the loop 31 in the line 30 and the weight of the load 45 is transferred to the retrieving line, the breakable tackings at 46, 47, 48 and 49 are broken away, the D-rings 54 and 56 are drawn upwardly on the loop 41, cutting through it and severing the load from the parachute.

A second form of the cutting device for severing the parachute from the retrieving line is shown schematically in Fig. 11. The load carrying cable 40' is formed of a plurality of separate and individual strands, $a$, $b$, $c$, and $d$. The cut knives 54' are sharpened D rings and correspond in number to the number of strands in the cable 41'. Each knife is threaded onto a single strand. The knives or D rings are permanently secured to the retrieving line 30' and are tacked at substantially vertical intervals, each one being secured to a strand as $a$ by a breakable tacking $a'$ (see Figs. 11 and 12) to the retrieving line at intervals as shown. When the line 30' is engaged and drawn upwardly, the knives slide upwardly reaching the position indicated in phantom on the drawing. Each strand is cut through as the weight of the load falls upon its encircling knife and the parachute severed from the load.

In the form of the device shown in Figure 4 a ribbon parachute is shown. It is to be understood that in any of the modifications, the use of a canopy of ribbon formation is optional and is adaptable to any of the devices shown.

In Fig. 4 a pair of extensions 36' and 38' constitute the temporary anchoring means for the retrieving line 30'. The line 30' is fastened by means of a permanent connection to the load X. Both ends of the loops of the retrieving line 30' are permanently fastened to the load X.

The double line is carried upwardly and divided into a loop 31' where the strands of the loop divide. It is attached by breakable connections 48' and 50' and 68 to the inflatable extensions 36' and 38'. A disconnect means 33 may be any standard device adapted for this purpose and may be either mechanical or explosive. In this form of device the load is retrieved and the parachute jettisoned. An example of the form of cutting device which may be used in this invention is to be found in applicant's patent, R. Gross, No. 2,742,697, issued Apr. 24, 1956 for a Cutting Implement.

Figs. 5 and 6 exemplify a triangular arrangement of the pickup loop. A canopy 70 is provided with three inflatable extension members 76. The position of the extension member is such that the loop of a retrieving line 75, attached to the top of the extensions 76, forms a triangle. Thus a rescuing aircraft is enabled to approach from almost any direction. Extensions 76 are shown in modified form. They are truncated pyramids instead of the cones previously shown. These pyramids present a modified air resistance.

Figs. 5 and 6 also show a means whereby a parachutist is enabled to change the direction he faces as he descends. He does this by rotation of his parachute. This is desirable for orienting himself for landing, for better observation, or for cooperating with rescuing aircraft in a pickup operation. That is, he may change his direction so that an advancing rescue aircraft can successfully engage his retrieving line.

For accomplishing this rotation, one, two, or more truncated pyramidal extensions are provided with a line or pull cord 78, which is attached to the inner top surface of the extension 76, and is operable by the parachutist 79.

Fig. 6 shows the extension 76 after it has been drawn inward and collapsed. When this occurs the equilibrium and air balance of the canopy are disturbed, and the parachute starts to rotate. If the parachutist wishes to continue rotating movement, at the proper moment he can let out the pull line and allow the collapsed extension 76 to reinflate, again changing the contour and the air resistance, and the rotational movement will be continued.

For various purposes of directional control, one, two or three control lines 78 may be placed at the disposal of the parachutist for deflating more than one of the inflated extensions. In the device shown in Figure 7 a canopy 70' is provided with a single conical extension 80 which is installed at the apex of the canopy. It has been found that this single centralized extension has a valuable stabilizing function.

In the devices shown in Figures 8, 9 and 10, the loop 102 of the retrieving line 104 is carried by a parachute 106 of relatively small size. The load 90 is initially supported by one parachute 92, two parachutes 94 and 96, or a cluster of parachutes 98 as shown in Figure 10. In each of these cases the retrieving line 104 has, of course, permanent attachment to the load 90 and bypasses a disconnecting element 114. As before noted, this element may be of any standard form either mechanical or electrical or explosive and in each of these cases the parachutes are all released from the load and jettisoned.

A plurality of loops 102 form an integral part of the construction of the parachute 106 so that wherever a hook carried by a rescue aircraft, such as the hook 116 shown in Fig. 12, catches into it, it also catches into a loop of the retrieving line 104. The parachute 106 may be used as a main parachute in any retrieving operation, independently and without the aid of any others. This form, as well as the others disclosed herein lends itself to mail delivery and camera reconnaissance missions referred to above.

Various showings of the description and drawing embody a specific form which is for exemplification purposes only, and it is to be understood that the invention is not limited by these specific forms. For example, the groupings of the shroud lines are immaterial to the invention.

Figure 12 shows a type of hook that may be used by a rescue aircraft. Any type may be used.

Much rescue work is done by helicopters, and the instant invention in any of its forms can be carried out by them. Furthermore, the retrieving system, in any of its forms, is not limited to any specific type of rescue aircraft.

The placing of the extensions on the parachute is a matter of experimentation and choice, and it is to be understood that their placement is not limited by the showing in the drawing. In general it has been found that better equilibrium is achieved if the extensions are placed nearer the edge of the canopy, and if they extend upwardly to a point in vertical line with the edge of the canopy.

We claim:

1. A device for retrieving in mid-air loads descending by parachute comprising a parachute canopy, shroud lines attached to said canopy, a load attached to the shroud lines, a retrieving line directly attached to said load and capable of sustaining its weight, a retrieving loop on said retrieving line forming a part of said line frangibly attached to said canopy and independent of the inflatable portion of said canopy, said loop being engageable by the retrieving hook of a rescue aircraft, and means for maintaining said loop in extended position above said canopy for engagement by said rescue aircraft.

2. A device for retrieving in mid-air loads descending by parachute comprising a parachute canopy, shroud lines on said canopy, a load attached to the shroud lines, a plurality of separate and individual cone-like sections on said canopy, integral and inflatable therewith and extending upwardly therefrom, a retrieving cable secured to said cone-like sections at points adjacent the tops thereof and providing a retrieving loop held extended and engageable by the retrieving hook of a rescue aircraft.

3. A device for retrieving in mid-air loads descending by parachute comprising a jettisonable parachute canopy, means for severably attaching said parachute canopy to said load, said means comprising a retrieving line attached to said load and capable of supporting the weight of said load, means for severably attaching said retrieving line to said canopy, a retrieving loop on said retrieving line engageable by a retrieving hook carried by an aircraft, means for severing the attachment between said load and said canopy to jettison said canopy.

4. The device as set forth in claim 3 wherein the means for severably attaching said parachute canopy to said load comprising shroud lines attached to said canopy and drawn through a first ring, a load carrying cable permanently attached to said load and secured to a second ring, an attaching link drawn through both of said rings, cut knives slidably carried on said link and permanently secured at spaced intervals to said retrieving line, said cut knives being moved along said link into cutting position to cut said link and sever the connection between said canopy and said load when the weight of the load is transferred to said retrieving line.

5. In a retrieving system for retrieving a load in mid-air which is descending by parachute, a parachute canopy, a plurality of cone-shaped sections introduced into said canopy inflatable therewith and forming an integral part thereof, said cone-shaped sections extending upwardly from the exterior portion of said canopy, a retrieving line, a retrieving loop formed on said retrieving line and permanently attached thereto, frangible elements securing said retrieving loop to the upwardly extending sections and forming a pickup line engageable by the retrieving hook of a rescuing aircraft advancing from anyone of a plurality of directions.

6. A device for separating a load from a parachute in mid-air comprising a link connecting the load to the shroud lines of said parachute, a load carrying cable connecting said load to said link, breakable connection between said load and said load carrying cable, means for connecting said link to said shroud lines, at least one cut knife secured into said link, the link being threaded through an opening in said cut knife and breakably tacked thereto, means for transferring the weight of said load temporarily to said cut knife so that the cut knife will slide upwardly on said link said means comprising a retrieving line secured to said load and to said cut knife and capable of being engaged by a retrieving aircraft.

7. A device for retrieving in mid-air loads descending by parachute comprising a parachute canopy, shroud lines attached to said canopy, a load attached to the shroud lines, a retrieving line directly attached to said load and capable of sustaining its weight, a retrieving loop on said retrieving line forming a part of said line, frangibly attached to said canopy and independent of the inflatable portion of said canopy, said loop being engageable by the retrieving hook of a rescue aircraft, and means for maintaining said loop in extended position above said canopy for engagement by said rescue aircraft, a cable link connecting the load to the shroud lines of said parachute, said cable link comprising a plurality of strands, a load line permanently connected to said load, a loop on said load line held extended for engagement by said retrieving aircraft, breakable connections between the canopy of said parachute and said load line, a plurality of cut knives permanently secured to said load line at spaced intervals, each separate strand of said cable link being threaded through an opening in one of said cut knives and breakably tacked to said strand so that the breakable tacking will be broken and the cut knives will slide upwardly to cut said cable link in increments when the weight of the load is transferred from said parachute to said aircraft.

8. A device for retrieving in mid-air loads descending by parachute comprising a parachute canopy, shroud lines attached to said canopy, a load attached to the shroud lines, a retrieving line directly attached to said load and capable of sustaining its weight, a retrieving loop on said retrieving line forming a part of said line, frangibly attached to said canopy and independent of the inflatable portion of said canopy, said loop being engageable by the retrieving hook of a rescue aircraft and means for maintaining said loop in extended position above said canopy for engagement by said rescue aircraft, a link for releasably securing said load to said parachute, said link comprising a cord loop comprised of a plurality of laminated strands, a series of cut knives, one cut knife frangibly tacked to each of said strands and slidably threaded thereon, a load line permanently secured at intervals to each of said cut knives so that each cut knife will slide to the top portion of its strand and cut said strand when upward pull is applied to said load line and whereby the plurality of said laminated strands of said link are cut successively.

References Cited in the file of this patent

UNITED STATES PATENTS

| | | |
|---|---|---|
| 1,186,230 | Riches | June 6, 1916 |
| 1,194,691 | Adams | Aug. 15, 1916 |
| 1,319,553 | Ziegenfuss | Oct. 21, 1919 |
| 2,679,689 | Jessen | June 1, 1954 |

FOREIGN PATENTS

| | | |
|---|---|---|
| 146,525 | Austria | July 10, 1936 |
| 166,552 | Austria | Aug. 25, 1950 |
| 344,591 | Germany | Nov. 25, 1921 |
| 802,674 | France | Sept. 10, 1936 |
| 717,266 | Great Britain | Oct. 27, 1954 |